(12) United States Patent
Jallat et al.

(10) Patent No.: US 12,442,444 B2
(45) Date of Patent: Oct. 14, 2025

(54) SYSTEM FOR REDUCING TEETH POWER LOSSES IN A GEARBOX

(71) Applicant: FLENDER-GRAFFENSTADEN S.A.S., Illkirch-Graffenstaden (FR)

(72) Inventors: Eric Jallat, Illkirch-Graffenstaden (FR); Thomas Gaulier, Wolfisheim (FR); Thomas Marmagne, Strasbourg (FR)

(73) Assignee: FLENDER-GRAFFENSTADEN S.A.S., Illkirch-Graffenstaden (FR)

( * ) Notice: Subject to any disclaimer, the term of this patent is extended or adjusted under 35 U.S.C. 154(b) by 119 days.

(21) Appl. No.: 18/276,739

(22) PCT Filed: Feb. 1, 2022

(86) PCT No.: PCT/EP2022/052258
§ 371 (c)(1),
(2) Date: Aug. 10, 2023

(87) PCT Pub. No.: WO2022/171479
PCT Pub. Date: Aug. 18, 2022

(65) Prior Publication Data
US 2024/0133459 A1   Apr. 25, 2024
US 2024/0229917 A9   Jul. 11, 2024

(30) Foreign Application Priority Data
Feb. 11, 2021 (EP) .................... 21290005

(51) Int. Cl.
*F16H 57/04* (2010.01)
*F16H 57/021* (2012.01)

(52) U.S. Cl.
CPC ....... *F16H 57/0409* (2013.01); *F16H 57/021* (2013.01); *F16H 57/0423* (2013.01); *F16H 57/0456* (2013.01)

(58) Field of Classification Search
CPC .............. F16H 57/0409; F16H 57/021; F16H 57/0412; F16H 57/042; F16H 57/570421; F16H 57/0423; F16H 57/0424
See application file for complete search history.

(56) References Cited

U.S. PATENT DOCUMENTS 5,950,501 A * 9/1999 Deeg ..................... F16H 57/027
                                                  74/606 R
8,991,557 B2 * 3/2015 Arisawa ................... F02C 7/32
                                                    184/6.12

(Continued)

FOREIGN PATENT DOCUMENTS

DE    1840224 U    10/1961
DE    3607711 A1   10/1986

(Continued)

OTHER PUBLICATIONS

Japanese Notice of Allowance for Japanese Patent Application No. 2023-548921 dated Jan. 7, 2025 (3 pages).

(Continued)

*Primary Examiner* — Bobby Rushing, Jr.
(74) *Attorney, Agent, or Firm* — REISING ETHINGTON, P.C.

(57) ABSTRACT

A system for reducing teeth power losses in a gearbox, including at least two intermeshing toothed gears, each attached to a rotating shaft supported by bearings and mounted within a housing. Two vertical plates are configured for being installed inside the housing between the bearings and the toothed gears, one at each side of the toothed gears. The vertical plates comprise one or several internal shields configured for separating oil flows within the housing; mounted on the side of the vertical plates directed towards the toothed gears. The internal shield includes an anti-recirculation plate. At least one anti-recirculation plate (Continued)

comprises one or several vertical fins for breaking an axial flow of an air-oil mixture.

12 Claims, 4 Drawing Sheets

(56) References Cited

U.S. PATENT DOCUMENTS

| | | | |
|---|---|---|---|
| 9,989,143 B2* | 6/2018 | Fomison | F16H 57/0409 |
| 10,378,640 B2 | 8/2019 | Kaemmerer et al. | |
| 10,816,081 B2 | 10/2020 | Kämmerer et al. | |
| 2013/0233107 A1* | 9/2013 | Von Wilmowsky | F16H 57/02 |
| | | | 74/421 R |
| 2018/0313443 A1 | 11/2018 | Kaemmerer et al. | |
| 2019/0195335 A1 | 6/2019 | Kaemmerer et al. | |
| 2020/0109776 A1* | 4/2020 | Mueller | F16H 57/045 |
| 2020/0132183 A1 | 4/2020 | Günnel et al. | |

FOREIGN PATENT DOCUMENTS

| | | | | |
|---|---|---|---|---|
| DE | 102018208286 A1 * | 11/2019 | | |
| JP | 2012021547 A * | 2/2012 | | F16H 57/0409 |
| JP | 2017516965 A | 6/2017 | | |
| JP | 2019521291 A | 7/2019 | | |

OTHER PUBLICATIONS

English Translation of Japanese Notice of Allowance for Japanese Patent Application No. 2023-548921 dated Jan. 7, 2025 (2 pages).
International Search Report for International Application No. PCT/EP2022/052258 dated May 10, 2022 (4 pages).
Written Opinion for International Application No. PCT/EP2022/052258 dated May 10, 2022 (6 pages).

* cited by examiner

SYSTEM FOR REDUCING TEETH POWER LOSSES IN A GEARBOX

INTRODUCTION

The disclosure relates to the technical field of gearboxes (also called transmissions) comprising mechanical gears, and concerns, more precisely, teeth power losses in such gearboxes.

Known in the art gear mechanisms are usually fitted into a housing (or casing) and comprise at least two gears, namely a first gear and a second gear, that are toothed parts, and each secured to a shaft rotating in bearings joined to the housing. The teeth of said gears are engaged with one another so that the rotation of one of the gears drives the other gear into rotation. The housing forms thus a transmission casing used, for instance, for the drive of generators by turbines. The housing and the gear mechanism fitted inside said housing form the so-called gearbox that is typically used for converting a torque and speed from one rotating machine, that is, for instance, the rotating power source, to a torque and speed adapted for another rotating machine or device.

The present disclosure, per at least some embodiments, is more particularly interested in turbo gearboxes, i.e. high-speed transmissions, characterized by a pitch line velocity comprised between 60 to 180 m/s.

The conversion of the torque and speed indubitably results in power losses that manufacturers seek to minimize. The present disclosure, per at least some embodiments, focuses more particularly on teeth power losses (hereafter "TPL") that appears notably in the turbo gearboxes. These TPL might originate from:
  Friction within the gearbox, notably between the gears;
  Pumping effect, which comes from a non-adequate amount of lubricating oil used for lubricating a meshing area of the gears;
  Windage coming from the rotational speed of the gears which drive into movement the surrounding fluids;
  Oil jets which are not adequately oriented and or with excessive flow.

In order to reduce TPL, different solutions have been proposed by the manufacturers. One solution is based on a vacuum, for instance a partial vacuum, created in the housing of the mechanical gears in order to reduce aerodynamics losses. Other solutions are based on a close encapsulation of the gears for reducing windage losses. Other systems focused on the cooling of the gears. Indeed, it is known that the heat induced in the meshing area wherein the gear teeth are engaged during operation is dissipated mainly by a lubricant which serves at the same time for the lubrication of said area. Increasing the flow of lubricant in this area will on one hand further cool down said area, but on the other hand, and unfortunately, also considerably increase power losses. For this reason, additional cooling devices have been proposed by manufacturers in order to keep the system efficient while keeping the lubricant flow at a reasonable value, i.e. that does not increase power losses. Known in the art cooling devices comprise for instance cooling ducts configured for cooling an enveloping wall enclosing the gears. However, such solution prevents an easy access to the different parts of the gearbox and makes thus maintenance actions more complex and complicated.

US 2019/195335 A1 shows a system for reducing TPL in a gearbox.

US 2020/132183 A1 shows a gearbox with meshing gears, wherein internal shields are provided covering a part of gears inside a housing of the gear box.

US 2018/313443 A1 shows a cylindrical-gear gearing with two meshing gears, wherein each gear comprises a shaft supported at both axial in a respective plate. A shield is provided between the plates slightly spaced to the associated gear encompassing a circumferential part of this gear.

The known solutions are thus usually complex, and therefore, simple and efficient solutions are still needed, which notably do not complexify maintenance actions.

SUMMARY

It is an objective of at least some embodiments of the present disclosure to propose a simple and efficient system for reducing TPL in a gearbox.

The present disclosure, per at least some embodiments, concerns thus a system for reducing TPL in a gearbox, the system comprising a set of two independent vertical plates configured for being installed inside a housing of the gearbox for separating a first oil flow used for cooling and/or lubricating teeth of gearbox toothed gears from a second oil flow used for lubricating/cooling hydrodynamics bearings supporting rotating shafts of the gearbox, the toothed gears being mounted or fixed to said rotating shafts. Each vertical plate is mounted laterally (with respect to the axial direction of the rotating shafts) between the toothed gears of the gearbox and the bearings supporting the rotating shafts to which the toothed gears are fixed, the latter being thus sandwiched between the two vertical plates. The plates are called "vertical plates" because they are mounted substantially perpendicularly to the rotating shafts. A space comprised between 10-40 mm is preferentially managed laterally between the side of the toothed gears and the vertical plate to allow axial displacement when needed.

The present disclosure, per at least some embodiments, concerns also a gearbox comprising said system for reducing TPL. As known in the art, said gearbox comprises at least two intermeshing toothed gears, each of the at least two toothed gears being attached to said rotating shaft and rotatable around an axis of rotation of the rotating shaft, each rotating shaft being thus mounted rotatable around said axis of rotation in bearings preferentially supported by the gearbox housing.

The set of vertical plates comprises thus at least two vertical plates, each vertical plate being configured for being removably installed inside said housing, between the bearings supporting the rotating shafts and the toothed gears, one vertical plate on each side of the toothed gears so that the latter be sandwiched between the vertical plates, said vertical plates being independent from one another in that they can be installed one after the other inside said housing, i.e. the vertical plates are free of definitive fixing means which would bind them together like a welding. The advantage, per at least some embodiments, is to enable assembling and disassembling the system according to the disclosure in already existing gearboxes. According to the present disclosure, per at least some embodiments, each vertical plate comprises two openings, each opening fitted to one of said rotating shafts.

The vertical plates according to the disclosure, per at least some embodiments, comprise a set of shields for separating oil flows within the housing of the gearbox, notably:
  one or several external shields for separating the first oil flow configured for cooling and/or lubricating the toothed gears from the second oil flow configured for cooling and/or lubricating the bearings. The external shields are mounted on the side of the vertical plates 2 that is directed towards the exterior of the housing 10, thus in a space comprised between the vertical plate 2 and a wall of the housing 10; and/or one or several internal shields for limiting or preventing a recirculation of toothed gears cooling oil dispersed by the rotation of the toothed gears, and the corresponding oil flow thereof that is more precisely an air-oil mixture flow. The internal shields are mounted on the side of the vertical plates 2 that is directed towards the toothed gears 11, 12, thus in a space comprised between the two vertical plates 2.

Preferentially, per at least some embodiments, each vertical plate comprises or is formed by a bottom plate and a top plate that are configured for being disposed or installed vertically one above the other in order to form said vertical plate, wherein preferentially an edge of each of said openings belongs to the bottom plate and another edge of each of said openings belongs to the top plate in order to enable assembling the bottom and top plates around the rotating shafts, said assembling resulting in said edge and said another edge fitting the circumference of the rotating shaft and surrounding the latter. Indeed, according to the present disclosure, per at least some embodiments, each vertical plate is configured for being installed inside said housing with the two openings each fitted around one the rotating shafts.

Preferentially, per at least some embodiments, each vertical plate comprises for each bearing said external shield for separating the first oil flow from the second oil flow. Said external shield is configured for surrounding a top part of the bearing—it is therefore a kind of fender or hood—and for guiding the second oil flow towards a receptacle configured for collecting said second oil flow. Preferentially, per at least some embodiments, said external shield comprises a first part fixed to the top plate, and a second part fixed to the bottom plate, the first and second parts being preferentially a curved plate and a flat plate. Preferentially, per at least some embodiments, the second part comprises two secondary plates, e.g. rectangular plates, directed, e.g. according to the length of said rectangular plates, towards the bottom of the bottom plate (e.g. towards said receptacle), wherein the first part of the external shield surrounds said top part of the bearing and fits (i.e. its extremities located at each side of the bearing fit) between the two secondary plates, so that the secondary plates form an extension of the shield first part on the bottom plate, said extension extending towards the bottom of the bottom plate. Each of said external shields (one for each bearing supporting a rotating shaft) is therefore configured for collecting the second oil flow that is dispersed during the working of the gearbox bearings, and for guiding said second oil flow towards the bottom of the gearbox, i.e. towards said receptacle. According to the present disclosure, per at least some embodiments, each point of one of said secondary plates is separated from a point of the other secondary plate by a distance greater than the diameter of the bearing it surrounds in order to enable an easy installation of the bottom plate within the housing. The previously described technical construction presents the advantage, per at least some embodiments, that oil droplets of said second oil flow arrive on internal wall of said external shield (i.e. the shield wall directed towards the bearing, i.e. whose surface normal vector points towards the bearing) during working of the gearbox, and flow along said wall by gravity towards the receptacle. The vertical plate may further comprise one or several chocks mounted on the side of the vertical plate comprising said external shield and configured for resting against a lateral wall of the housing, serving as a stop for the vertical plate.

Said internal shield for preventing a recirculation comprises preferentially, per at least some embodiments, anti-recirculation plates configured for preventing or limiting cooling oil of the first oil flow to be recirculated. The anti-recirculation plates are located inside the housing, after (according to the direction of rotation of the toothed gears) a spraying zone located on the external surface of the toothed gear and defined by a teeth cooling system located inside the housing, said anti-recirculation plates being configured for preventing an air-oil mixture to be driven by the rotation of the toothed gears towards the meshing area (i.e. by following a curved path, substantially circular, leading to the meshing area), wherein said air-oil mixture results from an ejection within the spraying zone and by a cooling nozzle of the cooling system of cooling oil directed towards and against the external surface of the toothed gear. In particular, the anti-recirculation plates are configured for being fixed to at least one of the vertical plates. Other fixing means might be used in cooperation with the fixing to the vertical plates or alternatively to the fixing to the vertical plate, for instance by using fixing means like screw for attaching the anti-recirculation plates directly to the housing. The system according to the disclosure, per at least some embodiments, comprises preferentially at least two anti-recirculation plates, one for each toothed gear of the gearbox. Preferentially, per at least some embodiments, each anti-recirculation plate comprises a first extremity configured for being directed towards the toothed gears and a second and opposed extremity configured for being directed towards the housing. The first extremity has an edge substantially parallel to the axis of rotation, a length extending along a width, preferentially the whole width, of the toothed gear, said edge being located close to the circumference of said toothed gear, while the second extremity may comprise an edge located close to a housing wall, preferentially fitted to a geometry of the latter, for instance so as to rest on the latter, said edge of the second extremity extending along said wall of the housing according to a length preferentially equal to said width of the toothed gear. Preferentially, per at least some embodiments, each anti-recirculation plate is fixed to at least one vertical plate, preferentially to both vertical plates, and defines in particular a plane that is substantially perpendicular to the vertical plate. Each anti-recirculation plate is preferentially, per at least some embodiments, slidably fixed to the vertical plate so as to enable to tune a space separating the anti-recirculation plate from the toothed gear, i.e. said first extremity from the external surface of the toothed gear. Advantageously, per at least some embodiments, the anti-recirculation plates define two distinct volumes within the housing of the toothed gears, a first volume located above the anti-recirculation plates and toothed gears, and a second volume located below the latter, wherein the air-oil mixture generated by the cooling system in the second volume (and thus the corresponding flow thereof) is prevented, at least partially, to reach the first volume by the anti-recirculation plates.

Preferentially, per at least some embodiments, the cooling system according to the disclosure comprises one or several cooling nozzles located beneath the toothed gears and configured for directing a cooling oil flow towards the external surface of the toothed gears, notably at least one cooling nozzle directing a first cooling oil flow towards one of the toothed gears and at least one cooling nozzle directing a second cooling oil flow towards the other one of the toothed gears, each cooling nozzle being configured for ejecting said cooling oil on the external surface of the respective toothed gear. Preferentially, per at least some embodiments, the angle defined by an orientation (or direction) of the cooling oil jet at the exit of the cooling nozzle and the external surface of the toothed gear that is cooled down by said cooling oil jet is comprised between 90° (i.e. the nozzle jet, or more precisely said orientation, is oriented radially with respect to the toothed gear external surface) and 180° (i.e. said orientation is tangential to the external surface). In particular, said angle is defined as the angle formed by two rays which start at a common point that is an intersection of said orientation or direction when extended until cutting the toothed gear external surface, one of the ray being defined by said orientation or direction when extended until said common point and the other ray being the tangent to the toothed gear external surface at said common point starting from said common point and extending in the direction of rotation of the toothed gear, and the angle according to the disclosure, per at least some embodiments, being comprised within the interval [90°, 180°[. According to the present disclosure, per at least some embodiments, said cooling nozzles are located after the meshing area when considering the direction of rotation of the toothed gears, usually below the latter so that cooling oil dispersed by the rotation of the toothed gears is prevented to reach the first volume and falls by gravity towards an oil receptacle. Preferentially, per at least some embodiments, the cooling system comprises at least one additional nozzle, called lubricating nozzle, dedicated to the cooling and/or lubrication of the meshing area, i.e. configured for having an oil jet directed towards the teeth engagement of the toothed gears, wherein the flow of oil used for said cooling/lubrication is controlled by a feedback loop in function of a temperature within the housing. Alternately, the lubricating nozzle(s) might be part of an independent lubrication system which cooperates with the cooling system and might be controlled by said feedback loop.

Independently, a further system for reducing teeth power losses in a gearbox is provided, wherein the system comprises at least two intermeshing toothed gears, each attached to a rotating shaft supported by bearings and mounted within a housing, two vertical plates configured for being installed inside said housing between the bearings and the toothed gears, one at each side of the toothed gears, wherein the vertical plates comprise one or several shields configured for separating oil flows within the housing, wherein the vertical plates comprise one or several shields, called hereafter "external shields", mounted on the side of the vertical plates that is directed towards the exterior of the housing, wherein each external shield is formed as an inversed "U-shape" configured for surrounding one of the bearings.

Particularly the system may comprise one or several shields, called hereafter "internal shields", mounted on the side of the vertical plates directed towards the toothed gears, wherein the internal shield comprises an anti-recirculation plate, wherein particularly at least one anti-recirculation plate comprises one or several vertical fins for breaking an axial flow of an air-oil mixture. The system may be designed further as previously or hereinafter described.

BRIEF DESCRIPTION OF THE FIGURES

Further description and details of the disclosure will be described now on the basis of embodiments illustrated by the following figures, wherein like numerals are used for like and corresponding parts.

DETAILED DESCRIPTION

Figure 1:
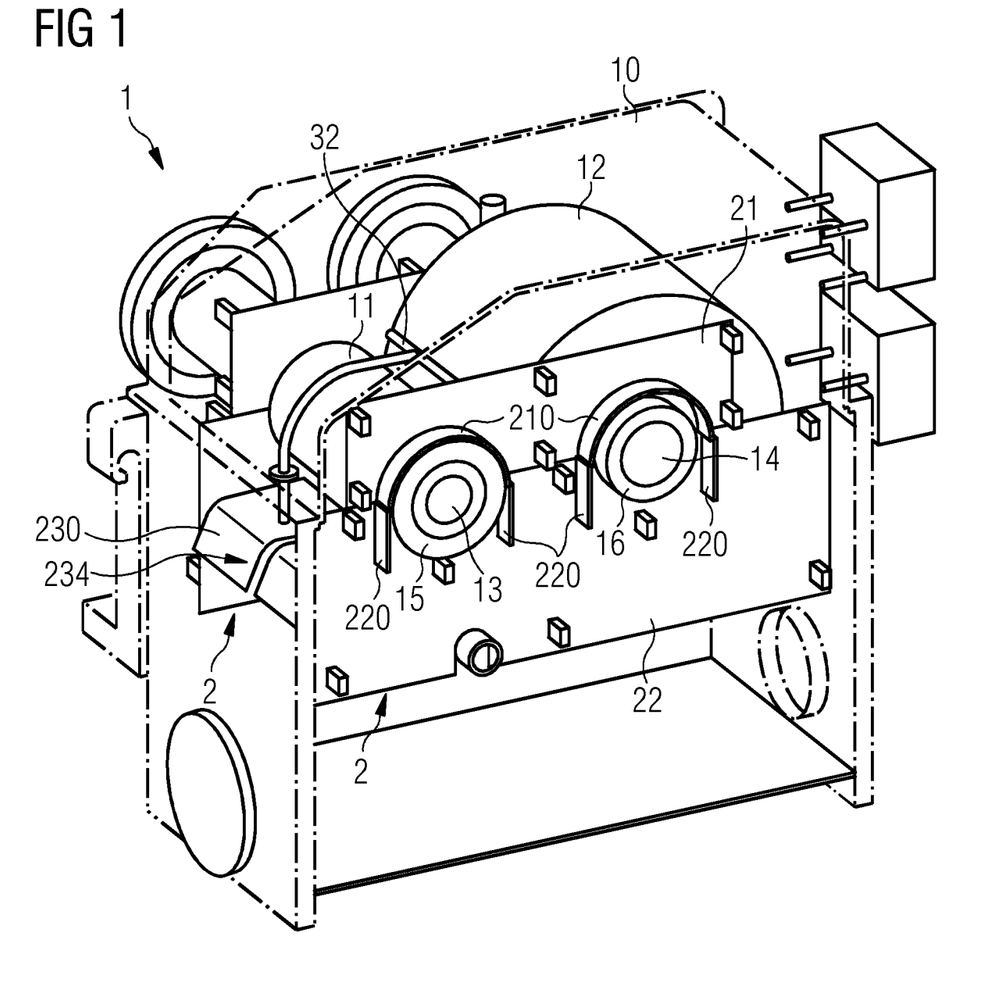
FIG. 1 Cross sectional view of a schematic representation of a gearbox according to an embodiment.

FIG. 1 shows a gearbox 1 comprising a system for reducing TPL according to an embodiment. The gearbox 1 comprises toothed gears, namely a first toothed gear 11 and a second toothed gear 12 known in the art. The teeth of the toothed gears are in a meshing engagement with one another. This meshing engagement takes place in a meshing area M (see FIG. 4). Due to this meshing engagement, the rotation of the first toothed gears 11 according to the direction of rotation w1 (see the corresponding arrow in FIG. 4) drives into rotation the second toothed gears according to the rotation direction w2 (see the corresponding arrow in FIG. 4) or vice et versa. Each toothed gear is fixed to a rotating shaft supported by at least one bearing mounted within a gearbox housing 10, enabling the rotating shaft to rotate around its axis of rotation. For instance, the first toothed gear 11 is attached to a first rotating shaft 13 supported by at least one bearing 15, and the second toothed gear 12 is attached to a second rotating shaft 14 supported by at least one bearing 16, both bearings 15, 16 being typically supported by the housing 10. Preferentially, per at least some embodiments, two bearings support the rotating shaft 13, 14, one at each side of the toothed gear to which the rotating shaft is fastened.

The system for reducing TPL comprises one or several vertical plates 2, wherein for each bearing of the gearbox, at least one vertical plate 2 is installed for separating said bearing 15, 16 from the toothed gears 11, 12. As already explained before, "vertical" means substantially perpendicular to the axis of rotation. The vertical plates are simply side panels mounted on each lateral side of the toothed gears 11, 12, between the latter and the bearings 15, 16 supporting the rotating shafts 13, 14. Each vertical plate 2 is thus a thin plate, preferentially a metallic plate, comprising two lateral sides, one directed towards the toothed gears 11, 12, i.e. facing the toothed gears 11, 12, and the other one directed towards the outside of the housing 10, i.e. facing a wall of the housing.

As shown in FIG. 1, the vertical plate 2 is installed in an axial space separating the toothed gear 11, 12, from the bearing 15, 16. The same applies on the other side of the toothed gear 11, 12, wherein another vertical plate 2 is installed. Each vertical plate is preferentially, per at least some embodiments, perpendicular to the rotation axis of the rotating shaft 13, 14, but other configurations might be envisaged depending on the geometries of the housing, bearings and toothed gears. Therefore, according to at least some embodiments, for toothed gears 11, 12 fixed to rotating shafts 13, 14 supported at each side of the toothed gears by bearings 15, 16, two vertical plates 2 might be installed in the housing 10, one vertical plate on one side of the toothed gears and the other vertical plate on the other side of the toothed gears so that the toothed gears are sandwiched between said vertical plates as shown in FIG. 1.

The vertical plates 2 according to at least some embodiments are configured for separating a first oil flow configured for cooling and/or lubricating the toothed gears from a second oil flow configured for cooling and/or lubricating the bearings, and/or separating, with respect to the first oil flow, an oil flow configured for cooling the toothed gears (said oil flow being directed to a spraying surface located after the meshing area with respect to the rotation of the toothed gears) from an oil flow configured for mainly lubricating the toothed gears (said flow being therefore directed towards the meshing area).

For said separation of the different oil flows, the vertical plates according to at least some embodiments comprise a shield system made of one or several shields for separating different oil flows within the housing of the gearbox. Said one or several shields act in particular like fenders or hoods and are preferentially metallic shields configured for being fixed to the vertical plates. Each vertical plate 2 is preferentially, per at least some embodiments, a removable plate that can be easily withdrawn from or installed within the housing 10. Each vertical plate 2 is preferentially made of two separates plates, namely a top plate 21 and a bottom plate 22 configured for being installed one over the other, e.g. aligned vertically one over the other, in order to form said vertical plate 2. Each vertical plate 2 comprises at least two openings, each of said two openings being fitted to one of said rotating shafts 13, 14, i.e. being a circular opening. Preferentially, per at least some embodiments each opening is arranged on both the top and bottom plate, having thus one edge in a form of a circular arc being part of the top plate and another edge in a form of circular arc being part to the bottom plate, so that, when assembling the top and bottom plates, these two edges form together said circular opening fitted to the diameter of the corresponding rotating shaft. The distribution of these two edges of each opening on the bottom and top plates enable an easy mounting of the vertical plate within the housing of the gearbox.

The shield system according to at least some embodiments comprises at least an external shield and/or an internal shield. The external shield is configured for separating the first oil flow from the second oil flow. It is called "external", because it is fixed to the side of the vertical plate 2 directed towards (i.e. whose surface normal is directed towards) the bearing. The internal shield is configured for separating, for said first oil flow, a cooling oil flow from a lubricating oil flow, and it is called "internal", because it is fixed to the side of the vertical plate 2 directed towards the toothed gears, i.e. towards the interior of the housing.

Figure 2:
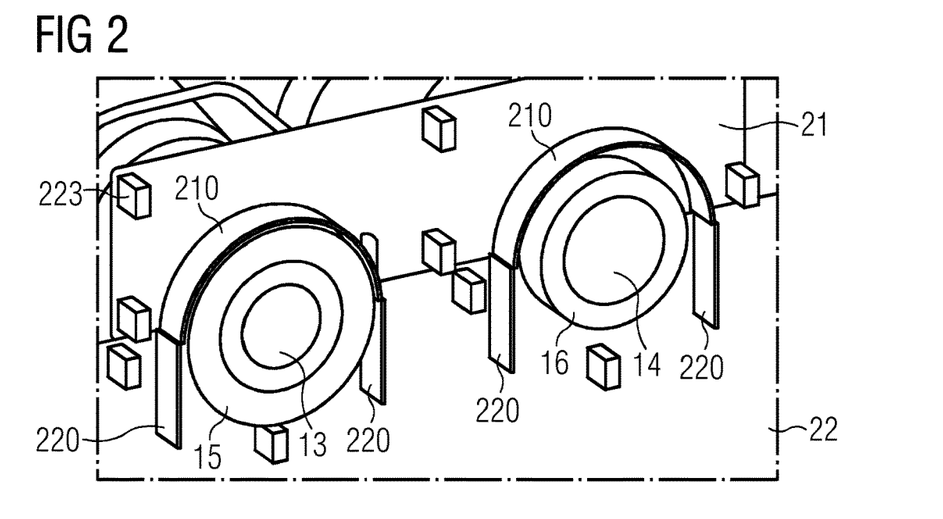
FIG. 2 Enlarged view of the external shield of FIG. 1.

The external shield is configured for surrounding at least partially the bearing 15, 16. According to at least some embodiments, each bearing 15, 16, might be partially surrounded by an external shield. Each external shield is preferentially, per at least some embodiments, characterized by an inversed U-shape which is open towards the bottom of the housing for letting oil flowing by gravity towards said bottom. The external shield comprises in particular a first part 210 which is a curved part, e.g. made of a curved plate, and optionally a second part 220, which is a flat straight part, e.g. made of a flat straight plate, said first part 210 together with said second part 220 forming said inversed U-shape. Preferentially, per at least some embodiments, the first part 210 is fixed to the top plate 21, and if any, the second part 220 is fixed to the bottom plate 22. The first part 210 is configured for surrounding a top part of the bearing 15, 16 in order to collect centrifugated oil of the bearing and the second part 220 is configured for extending extremities of the top part 210 towards the bottom of the housing 10 in order to guide the collected oil towards a receptacle or oil tank of the housing 10, the collected oil flowing from the top to the bottom by gravity during working of the gearbox. The first part 210 might have a semicircular shape fitted to the circumference of the bearing 15, 16 and spaced apart from the latter. Said first part 210 acts like a hood configured for collecting oil dispersed by the bearing 15, 16 forcing said oil to remain within the volume enclosed by the external shield. By installing the top plate 21 vertically on the bottom plate 22, extremities of the first part 210 of the external shield are configured for fitting between secondary plates of the second part 220, in order to form preferentially said inversed "U"-shape for each bearing 15, 16, the first part 210 being the curved part of the inversed U-shape and the second part 220 comprising each bar of the inversed U-shape, the curved part preferentially fitting between the bars of the U-shape, i.e. slotting in a space separating the bars of the U-shape. Due to this geometry of each external shield, dispersed oil of the bearing is collected within the U-shape and guided along the bars of the U-shape towards a receptacle located for instance beneath the bearings 15, 16. Details of the external shield are presented in the enlarged view provided by FIG. 2. On the side of the vertical plate comprising said external shield, the vertical plate further comprises one or several chocks 223.

Figure 3:
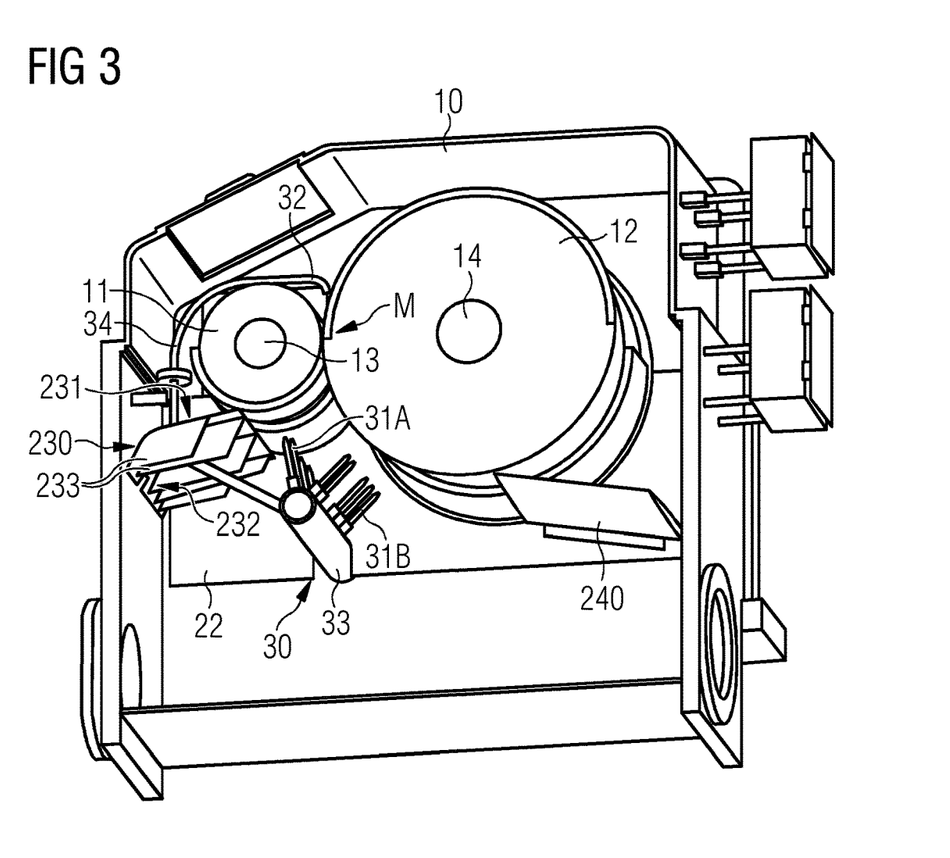
FIG. 3 Exemplary embodiments of anti-recirculation plates according to an embodiment.

FIG. 3 shows an internal view of the housing 10 of the gearbox according to at least some embodiments. As previously explained, the vertical plate 2 may also comprise internal shields for separating different oil flows. Said internal shields comprise anti-recirculation plates 230, 240 that might be fixed to the vertical plate 2, notably to one or both bottom plates and/or to one or both top plates 21, 22 sandwiching the toothed gears 11, 12. The anti-recirculation plates 230, 240 are configured for separating an oil flow of the cooling system 30 that is designed for cooling an angular sector of the toothed gears 11, 12, from another oil flow generated by said cooling system 30—in such a case, the cooling system has not only a cooling function, but is also able to lubricate the meshing area M, being thus a cooling and lubrication system—or by a lubrication system, wherein said another oil flow is essentially configured for lubricating the meshing area M of the toothed gears 11, 12.

The cooling system 30 according to at least some embodiments comprises notably one or several cooling nozzles 31A, 31B, wherein a first set of cooling nozzles 31A of the cooling system 30 are configured for spraying an external surface of the first toothed gear 11 and a second set of cooling nozzles 31B of the cooling system 30 are configured for spraying an external surface of the second toothed gear 12. Each of said external surfaces defines for the toothed gear a single angular sector extending along the whole width (i.e. axially) of the toothed gear and whose arc is sprayed by one of the cooling nozzles. Each set of cooling nozzles 31A, 31B is thus configured for spraying a zone defined on the external surface of the toothed gear, wherein said zone is located after the meshing area M, e.g. substantially beneath the latter. Preferentially, each nozzle jet makes an angle with the external surface of the toothed gear that is comprised within the interval [90°, 180°], 90° being a preferred value as shown in FIGS. 3 and 4, according to at least some embodiments.

Figure 4:
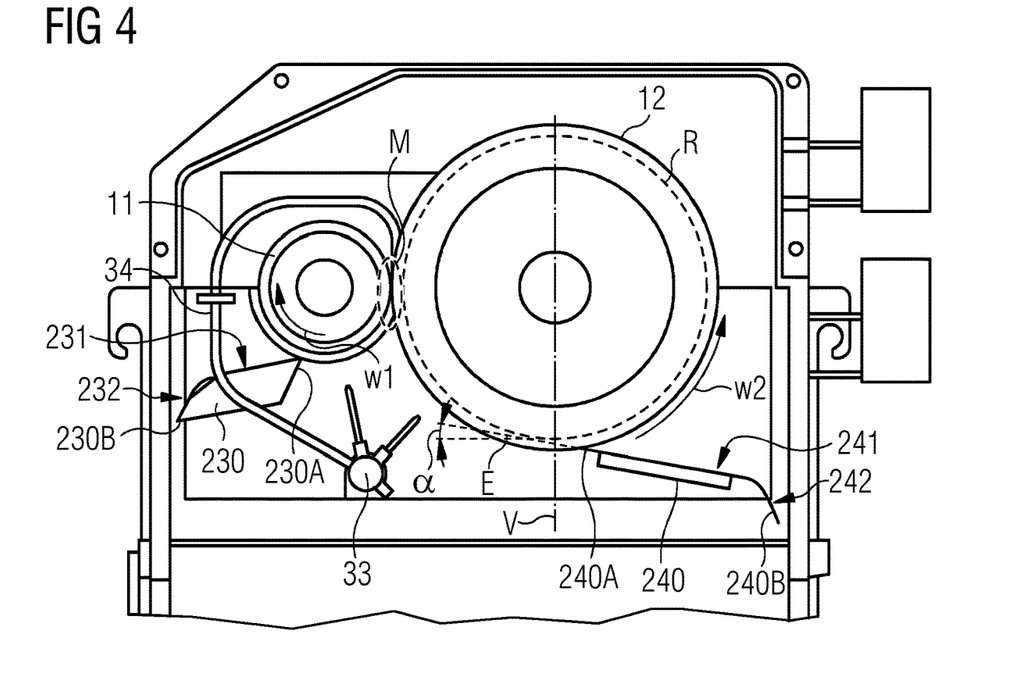
FIG. 4 Schematic illustration of an embodiment of a cooling system.

In addition to the cooling nozzles 31A, 31B, the system according to at least some embodiments comprises one or several lubricating nozzles 32 which can be part of the cooling system 30 as shown in the embodiments of FIGS. 3 and 4, or of a separate and independent lubrication system (not shown). The oil flow dispersed by said lubricating nozzle(s) 32 is preferentially, per at least some embodiments, controlled by a feedback loop that is a function of the temperature inside the housing 10 and is in particular oriented parallel to the tangential speed vector defined on the external surface of the toothed gear. Said oil flow is preferentially sprayed on the top of the meshing area M, said oil flow having for instance a substantially vertical orientation and being directed towards the bottom, so that both the first and second toothed gears are lubricated at the same time. Alternately, said oil flow might be sprayed only on the toothed gear 14 having the lowest rotational speed, on an area located at proximity and directly before said meshing area (M). Preferentially, per at least some embodiments, the lubricating nozzles 32 are connected to a secondary duct 34 for supplying them in oil, wherein said secondary duct 34 is connected to a main duct 33 configured for supplying in oil the cooling nozzles 31A, 31B. Preferentially, per at least some embodiments, the secondary duct 34 goes through the anti-recirculation plate 230, which comprises an opening 234 (see FIG. 1, 5 or 6) fitted to the whole or at least a part of the circumference of the secondary duct 34 so that an air-oil mixture originating from the oil sprayed by the cooling nozzles is prevented to reach through said opening the volume located above the anti-recirculation plate 230.

Figure 5:
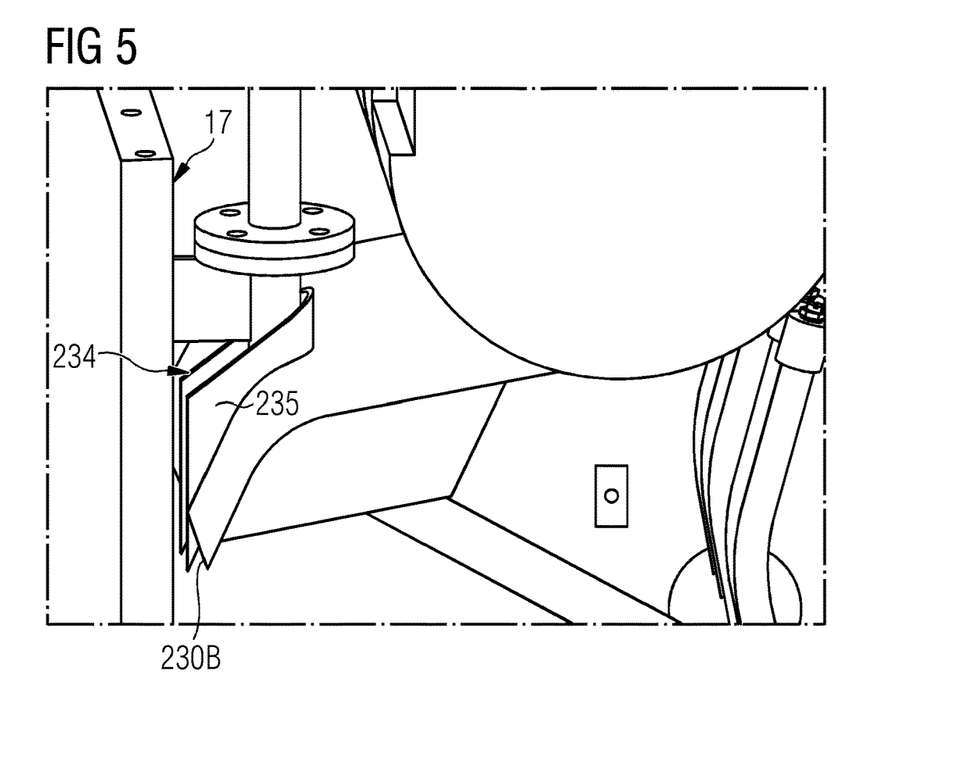
FIGS. 5 & 6 Schematic illustration of a detail of the anti-recirculation plate according to the invention.
Figure 6:
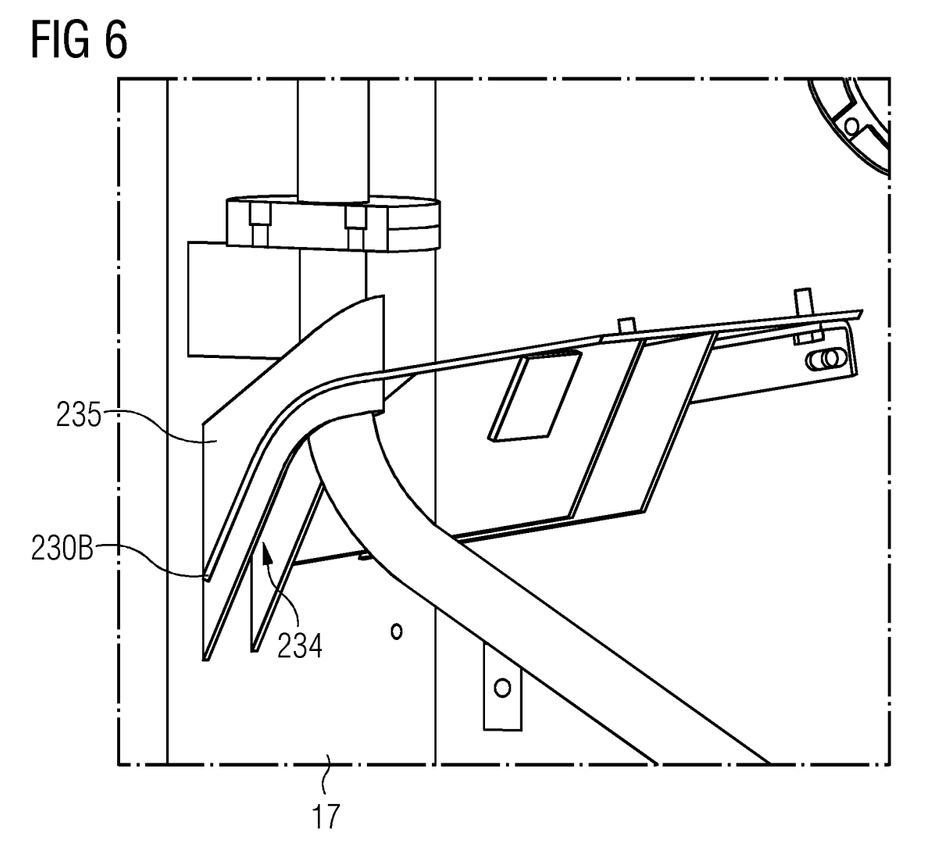

Preferentially, per at least some embodiments, and as illustrated by FIGS. 5 and 6, the anti-recirculation plate 230 comprises a U-shaped plate 235. The latter is for instance a plate bent into a U-shape and preferentially welded to the anti-recirculation plate 230 to create a structure enveloping with the curve of the U-shape the secondary duct 34 and having the arms of the U-shape directed towards a wall 17 of the housing 10, i.e. extending towards a second edge 230B of the anti-recirculation plate 230. Said U-shaped plate 235 creates within the anti-recirculation plate 230 said opening 234 fitted to the secondary duct 34. Indeed, the curved part of the U-shape creates a surface surrounding substantially vertically a predefined length of the secondary duct. In particular, a normal to said surface, wherein said normal is substantially parallel to the arms of the U-shape, is directed towards the cooling system 30 so that the curved part of the U-shape is configured for block a flow of an air-oil mixture coming from the cooling system 30 and directed towards the wall 17, while the space managed between the arms of the U-shape enables an easy montage of the anti-recirculation plate 230. The U-shaped plate 235 is preferentially, per at least some embodiments, perpendicular to a first inclined plane 231 and to a second inclined plane 232 of the anti-recirculation plate 230. In particular, the arms of the U-shape form each a substantially vertical plane connected to the curved surface of the U-shape and parallel to vertical fins 233 of the anti-recirculation plate 230.

According to the embodiment shown in FIGS. 3 and 4, the internal shield comprises preferentially two anti-recirculation plates for separating the cooling oil flow from the lubricating oil flow of the toothed gears 11, 12. A first anti-recirculation plate 230 cooperates with the first toothed gear 11, i.e. the toothed gear characterized by the highest rotational speed, and a second anti-recirculation plate 240 cooperates with the second toothed gear 12 for said separation of the oil flows, i.e. the toothed gear characterized by the lowest rotational speed. In the following, the wording "anti-recirculation plate" free of any specification whether the first or second anti-recirculation plate will be used to describe features comprised by both the first and second anti-recirculation plates unless specified otherwise.

The first anti-recirculation plate 230 comprises a first edge 230A directed towards the external surface of the first toothed gear 11 characterized by a length equal at least to the width of the first toothed gear and spaced apart from the external surface of said first toothed gear by a tunable distance (typically measured radially). Said first anti-recirculation plate 230 comprises a second edge 230B located at the opposite side of the first anti-recirculation plate compared to the first edge 230A, thus directed towards a wall of the housing and at a position (i.e. height) beneath the first edge 230A so that oil collected by the anti-recirculation plate at close proximity of the first edge 230A may flow by gravity towards the second edge 230B. The latter is fitted to said wall of the housing, preferentially free of contact with the latter so that oil flowing on the top part of the anti-recirculation plate may freely flow towards the bottom of the housing. The first anti-recirculation plate 230A comprises preferentially, per at least some embodiments, said first inclined plane 231 comprising said first edge 230A and said second inclined plane 232 comprising said second edge 230B, wherein the inclination of the first inclined plane 231 with respect to the horizontal is smaller than the inclination of the second inclined plane, said inclined planes 231, 232 being preferentially parallel to the rotation axis of the rotating shafts, joined to each other, e.g. by a curved surface, and extending along the width of the first toothed gear 11. Optionally, the first anti-recirculation plate 230 further comprises said vertical fins 233 attached perpendicularly to both the first and second inclined planes and configured for guiding an air-oil mixture, while preventing or breaking axial flows generated by the rotation of the toothed gears. Advantageously, per at least some embodiments, said fins further increase the rigidity of the anti-recirculation plate 230. Preferentially, the first anti-recirculation plate 230 comprises said opening 234 fitted to the secondary duct 34 so that said secondary duct 34 may extend from a first volume of the gearbox that is located at the bottom of the housing and that comprises the cooling nozzles 31A, 31B to a second volume of the gearbox that is located at the top of the housing and that comprises the lubricating nozzles 32. Preferentially, per at least some embodiments, said opening 234 comprises a U-shaped plate 235 fixed to the anti-recirculation plate and extended according to its length substantially vertically, i.e. perpendicular to the anti-recirculation plate 230, above and below the anti-recirculation plate 230 so as to block a flow of air-oil mixture coming from the cooling system 30 (see FIGS. 5 and 6).

As shown in FIG. 5, the second anti-recirculation plate 240 comprises a first edge 240A directed towards the external surface of the second toothed gear 12 characterized by a length equal at least to the width of the second toothed gear 12 and spaced apart from the external surface of said second toothed gear by a tunable distance (typically measured radially). Said second anti-recirculation plate 240 comprises a second edge 240B located at the opposite side of the second anti-recirculation plate compared to the first edge 240A, thus directed towards a wall of the housing and at a position (i.e. height) beneath the first edge 240A so that oil collected by the anti-recirculation plate at close proximity of the first edge 240A may flow by gravity towards the second edge 240B. The latter is fitted to said wall of the housing, preferentially free of contact with the latter so that oil flowing on the top part of the anti-recirculation plate may freely flow towards the bottom of the housing. The second anti-recirculation plate 240A comprises preferentially a first inclined plane 241 comprising said first edge 240A and a second inclined plane 242 comprising said second edge 240B, wherein the inclination of the first inclined plane 241 with respect to the horizontal is smaller than the inclination of the second inclined plane, said inclined planes 241, 242 being preferentially, per at least some embodiments, parallel to the rotation axis of the rotating shafts, joined to each other, e.g. by a curved surface, and extending along the width of the first toothed gear 11.

For both the first and second anti-recirculation plates, the tunable distance to said external surface enables to minimize the space between the first edge 230A, 240A and the external surface of the toothed gear so that said first edge 230A, 240A remains free of contact with said external surface during the working of the gearbox and that no additional heating is created within the housing by the minimization of said space. For tuning said tunable distance, the anti-recirculation plate 230, 240 is preferentially slidably fixed to the vertical plate 2. Said distance between the external surface and the first edge might typically vary between 2 mm and 7 mm. A higher value for said distance showed to decrease the efficiency of the anti-recirculation plate for separating the oil flows within the housing, and a higher value shown to increase the temperature within the housing 10.

Preferentially, per at least some embodiments, the axial length of the first and/or second anti-recirculation plate is greater than the width (i.e. axial length) of the toothed gear the closest to the considered anti-recirculation plate, managing therefore an axial space between the side of the toothed gear and the vertical plate flanking said side. Preferentially, per at least some embodiments, each vertical plate 2 comprises for each anti-recirculation plate 230, 240 a shelf bracket, the latter being fixed to it and configured for slidably supporting the anti-recirculation plate 230, 240. The cooperation of said shelf bracket with the anti-recirculation plate further enables to close the space between the anti-recirculation plate 230 and the vertical plate 2 over an extension length at least equal to ⅔ of the distance separating the first edge 230A from the second edge 230B. For instance, said shelf bracket extends longitudinally according to said extension length.

For both the first and second anti-recirculation plates, the first inclined plane 231, 241 is characterized in that, per at least some embodiments, its extension E towards the teeth of the closest toothed gear 11 intersects said toothed gear at the basis of one of its teeth, e.g. at the root diameter of the teeth, wherein the considered tooth is preferentially not aligned with the vertical V. Preferentially, per at least some embodiments, its extension is tangent to the root circle R of the closest toothed gear and inclined toward the bottom of the housing when moving away from said closest tooth gear. Preferentially, per at least some embodiments, the inclination of the first inclined plane with the horizontal is comprised between 0.55° and 25°, i.e. the angle α belongs to the interval [0.55°, 25°].

According to at least some embodiments, the internal shields enable to delimit two distinct volumes or zones around the toothed gear 11, 12 within the housing 10: a top volume and a bottom volume that are separated from each other by the internal shields, the toothed gears in meshing engagement, walls of the housing and the vertical plates 2. In the bottom volume, that comprises the cooling nozzles 31A, 31B, oil-air mixture driven into rotation by the toothed gear 11, 12 is prevented joining the top volume by the internal shields, notably said anti-recirculation plates. The internal shields together with the vertical plates enable thus to limit the quantity of oil-air mixture generated in the bottom volume to reach the top volume.

Due to this configuration, TPL is reduced. Indeed, since oil recirculation is reduced by means of the internal shields, energy loss resulting from pumping is reduced as well as ventilation. A consequence is then that the quantity of oil flow needed to cool down the toothed gears is also reduced. Additionally, in order to reduce oil lubricating flow generating pumping power losses on teeth, the oil flow sprayed by the lubricating nozzle can be controlled for minimizing the flow of lubricating oil required for creating an oil film prior to enter the meshing area M.

Advantageously, per at least some embodiments, the solution proposed by the present disclosure enables an easy access to the toothed gears, facilitating therefore maintenance actions. Additionally, since the toothed gears are not completely enveloped by plates (the volume inside the housing is simply separated into two zones/volumes), no additional cooling system is required.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. System for reducing teeth power losses in a gearbox, wherein the system comprises:
    at least two intermeshing toothed gears, each attached to a rotating shaft supported by bearings and mounted within a housing;
    two vertical plates configured for being installed inside the housing between the bearings and the toothed gears, one at each side of the toothed gears, each vertical plate comprising two lateral sides;
    wherein the vertical plates comprise at least one shield configured for separating oil flows within the housing;

wherein at least one internal shield being mounted on and fixed to one of the two lateral sides of the vertical plates directed towards the toothed gears;

wherein the at least one internal shield comprises at least one anti-recirculation plate, wherein the at least one anti-recirculation plate comprises one or several vertical fins for breaking an axial flow of an air-oil mixture; and wherein the at least one anti-recirculation plate comprises a first inclined plane, wherein an extension of said first inclined plane towards teeth of the closest toothed gear intersects said toothed gear at the root diameter of one of its teeth, being tangential to said root diameter.

2. The system of claim 1, wherein each vertical plate comprises a top plate and a bottom plate.

3. The system of claim 1, wherein the at least one anti-recirculation plate is slidably fixed to the vertical plate 2.

4. The system of claim 1, wherein the at least one anti-recirculation plate is inclined with respect to the horizontal so as to enable collected oil to flow from a position close to the toothed gears towards a wall of the housing.

5. The system of claim 1, wherein the vertical plates comprise at least one external shield mounted on and fixed to the other one of the two lateral sides of the vertical plates that is directed towards the exterior of the housing.

6. The system of claim 5, wherein each external shield of the at least one external shield is formed as an inversed U-shape configured for surrounding one of the bearings.

7. The system of claim 6, wherein said at least one external shield comprises a first part and a second part made respectively of a curved plate and flat plate and forming together said inversed U-shape around the bearing.

8. The system of claim 7, wherein the first part is fixed to a top plate and the second part is fixed to a bottom plate.

9. The system of claim 1, comprising a cooling system, wherein the cooling system comprises at least one cooling nozzle located beneath the toothed gears and configured for directing a cooling oil flow towards an external surface of the toothed gears.

10. The system of claim 9, wherein the at least one cooling nozzle directing a first cooling oil flow towards the first toothed gear and the at least one cooling nozzle directing a second cooling oil flow towards the second toothed gear.

11. The system of claim 9, wherein an angle defined by an orientation of a cooling oil jet at the exit of the at least one cooling nozzle and the external surface of the toothed gear that is cooled down by said cooling oil jet is comprised within 90° and 180°.

12. Gearbox comprising at least two intermeshing toothed gears, each attached to a rotating shaft supported by bearings and mounted within a housing, and the system according to claim 1.

* * * * *